Jan. 2, 1968   J. G. TRUMBLE   3,361,298
CAMPING UNIT FUEL TANK FILLER SPOUT CAP ASSEMBLY
Filed Oct. 6, 1965

INVENTOR.
JOHN G. TRUMBLE
BY
ATTORNEYS

# United States Patent Office 3,361,298
Patented Jan. 2, 1968

3,361,298
CAMPING UNIT FUEL TANK FILLER SPOUT CAP
ASSEMBLY
John G. Trumble, Rte. 3, Big Rapids, Mich. 49307
Filed Oct. 6, 1965, Ser. No. 493,445
3 Claims. (Cl. 222—5)

ABSTRACT OF THE DISCLOSURE

A fuel tank cap assembly for the liquid fuel tank of portable camping burner units, including an elongated, gas-cylinder-receiving housing with a spout-engaging, female, threaded socket on one end including a sealing gasket, the second end being open and threaded and having a removable threaded closure element sealingly attached; there being puncture means for puncturing a gas cylinder after both ends of the housing are sealed, for flow of gas through a passageway into the liquid fuel tank.

This invention relates to portable camping units and the like that employ liquid gasoline burners for cooking, light, or heat, and more particularly relates to a combination of a novel pressure attachment device on the gasoline tank filler spout of a camping stove, heater, lantern, blow torch or the like.

Camping units that employ gasoline burners are operated with the gasoline tank under pressure in combination with a vaporizer generator to cause the liquid fuel to vaporize as it is transferred from the tank to the burner. This pressure is normally obtained by tedious and repeated periodic operation of a manual reciprocating plunger pump on the fuel tank. Such a device is very dependable because of its manual operation actuation, but still requires periodic tedious pumping, with the heat or light gradually diminishing between pumping operations. It would be desirable to be able to depend on this manual pressurizer, but not be required to normally employ it. To accomplish this, however, would require power operation of the pump or additional pressurizing means on the tank. Both of these alternatives would require substantial added expense, complexity, and space on otherwise simple units, not to mention substantial rebuilding that would be required of the currently used millions of such units, if presently known mechanisms and devices were to be employed. It will be appreciated that the fuel tank must be kept sealed at all times to avoid potential hazards.

It is an object of this invention to provide a unique inexpensive gasoline tank filler spout cap assembly that effectively seals the filler spout, but also provides a unique pressure cylinder attachment for the gasoline tank of a portable unit such as a cook stove, a heater, a blow torch or a lantern, or the like, causing the unit to be normally independent of its manual pressurizing pump, but enabling reliance on the manual pump if its use is necessary. The device enables relatively constant and full intensity operation of the gasoline fueled unit. This combination not only enables operation of the burner unit by full pressurization without the tedious pumping operation normally required, but also can be manufactured using conventional techniques at a relatively small cost. It is extremely simple and inexpensive requiring no special fittings on the conventional gasoline tank. Rather, it simply replaces the conventional filler spout cap. It therefore acts both as a cap and as a special pressurizer unit. Because of its simple threaded attachability to the filler spout, it can either be sold as part of the original equipment, or can be sold as an attachment unit to be attached to the millions of units already in use. It is as easily removed for filling the gasoline tank as the normal cap, and just as easily replaced.

These and other objects of this invention will become apparent upon studying the following specification in conjunction with the drawings in which.

Figure 1:
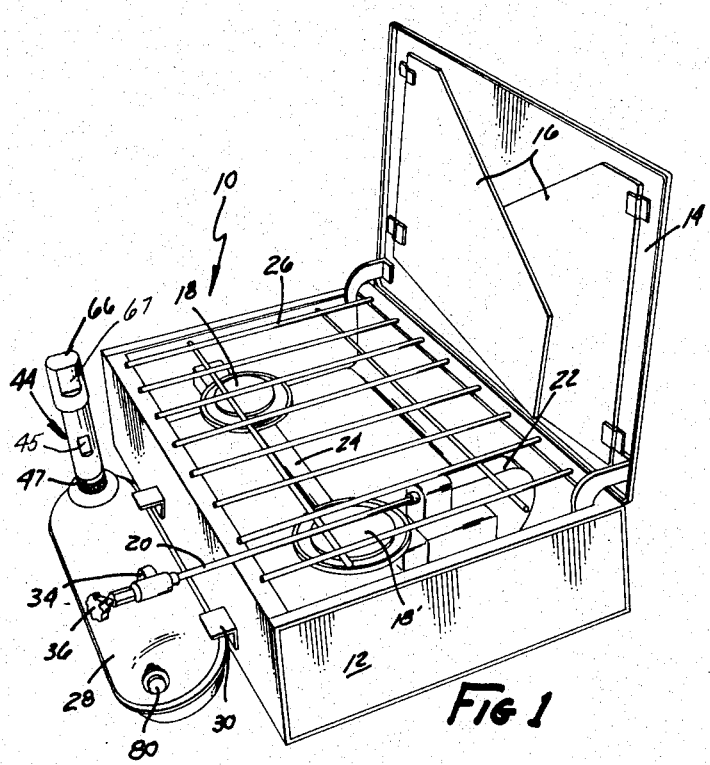
FIG. 1 is a perspective view of the camping stove shown in combination with the novel filler cap assembly.

Referring now specifically to the drawings, the cooking stove 10 illustrated in FIG. 1 includes a conventional housing 12 having a pivotal lift cover 14 and outwardly pivotal wind shield flaps 16. Inside the housing is a pair of like burners 18 and 18'. A conduit 20 conducts pressurized liquid gasoline to an expander vaporizer 22 of conventional type which directs the vaporized fuel into burner 18' directly, and through a conduit 24 into burner 18. A grill 26 covers the burners in conventional fashion.

The gasoline tank 28 is removably mounted to the front of the housing by suitable conventional brackets 30. Conduit 20 connects to the gasoline tank with fitting 34, and includes a tube (not shown) extending down inside the tank almost to the bottom. A control valve 36 regulates flow of gasoline through the conduit.

On one end of tank 28 is a conventional filler spout 40 (FIG. 2) which basically comprises an upstanding male sleeve threaded on its outer periphery and having a passage therethrough into the tank. Conventionally, a simple sealing cap is placed on this spout to allow removal for filling with gasoline.

In the novel combination, a unique type of combination filler spout cap and pressurizer assembly 44 is employed. This includes an elongated housing 46 generally cylindrical in configuration, and having a cylindrical hollow cavity 48 extending from end to end. The lower end of the housing includes a female interiorly threaded socket 50 having the same thread size, type and diameter as the male fitting 40 forming the gasoline tank filler spout. A central passageway 52 of smaller diameter extends between hollow cavity 48 in the housing and this female socket, to communicate with passage 41 in the spout. An annular seal retention groove 54 and seal are in the inner axial end of threaded cavity 50 for sealing engagement with the upstanding annular bead 43 on the end of spout 40.

The lower portion of housing 46 may have knurled outer peripheral surface portions 47 for gripping to obtain a tight sealed connection between female socket 50 and filler spout 40. Or it may have two or more flaps 45 for tightening with a wrench. The internal cavity of housing 46 is of slightly larger diameter than a conventionally marketed compressed carbon dioxide cylinder 60. Thus, a narrow gas passageway exists around the outside of cylinder 60 when placed in this housing. The narrow, necked-down base of the cavity contacting the hemispherical lower end of cylinder 60 has cavity slits or striations 62 formed therein to allow gas passage to passageway 52.

The opposite end of housing 46 from the female fitting is open. It has male threads on its periphery, interfitting with the female threads of a closure and puncture element 66. This element includes an annular seal 68 to seal against the open end of housing 46. It also includes a centrally located puncture element 70 projecting inwardly into the hollow element to cooperate with the closed upper end of cylinder 60, and particularly the puncturable sealing diaphragm 74 over its end. It should be noted that housing 46 and cap 66 are formed to cause the upper end of pressurized cylinder 60 to normally project above housing 46 and into the hollow element 66. Puncture of diaphragm 74 with element 70 occurs with tightening of element 66, and only subsequent to sealing compression of seal 68 against the upper end of housing 46. Thus, none of the released gas escapes upwardly from the housing when the puncture takes place. Element 66 may also have two or more opposite flats 67 to receive a wrench for tightening the element and puncturing the diaphragm.

The attachment is formed with two portions to enable the lower end to be tightened to constantly seal the fuel tank against leakage, yet without causing the pressurized cylinder to be punctured. The separate upper end element is tightened to cause the cylinder to be punctured at any selected time. It, therefore, normally acts as a sealing cap and a storage container for the pressurized cylinder, and selectively acts as a pressurizer actuator and container also.

Figure 2:
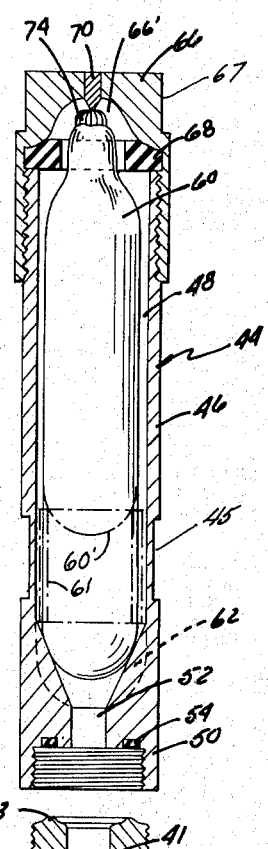
FIG. 2 is an enlarged, sectional, exploded view of the filler cap assembly and the spout portion of the gasoline tank.

Sometimes it may be desirable to employ a smaller pressurized cylinder as shown in phantom at 60' in FIG. 2. When so doing, a spacer such as annular cylindrical spacer 61 shown in phantom is inserted into housing 46.

Figure 4:
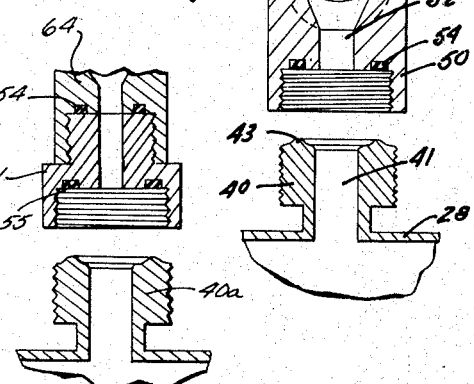
FIG. 4 is a fragmentary exploded view of the assembly in FIG. 3, but with an adaptor to fit a different size filler spout.

Further, the lower end of the attachment cap can employ an adaptor 71 as in FIG. 4, to enable its attachment to a different diameter and/or different thread filler spout 40a. The adaptor seals against seal 54 and has its own annular seal 55 to seal against the filler spout.

*Operation*

Assuming that novel assembly 44 is removed from filler spout 40, the gasoline tank 28 is filled through passage 41 of the filler spout in conventional fashion. Then the female socket 50 of assembly 44 is threaded onto the filler spout by gripping the housing 46 around its middle and lower portion and turning it until a seal is made at the spout. Prior to this, or subsequent to this, with cap 66 removed, a compressed gas cylinder 60 is inserted with the puncturable end up toward the open end of the housing. Then, cap 66 is threaded part way onto this housing, but not enough to cause a puncture.

When the unit is to be used, the operator merely rotates cap 66 one or more additional turns to cause seal 68 to be compressed, and just subsequent thereto, to cause puncture element 70 to puncture the upper end diaphragm of the gas cylinder. The gas then flows through hollow passageway area 66' in element 66, down around the cylinder through housing 46, and through passage 52 into passage 41 of the filler spout to compress the gasoline in the tank. Then, by operation of valve 36 in conventional fashion, the burner can be operated without the manual pumping operation normally required. Since this unit is attached to a conventional gasoline tank 28, manual pumping mechanism 80 is still maintained on one end of the gasoline tank in case the supply of pressure cylinders 60 is used up.

Figure 3:
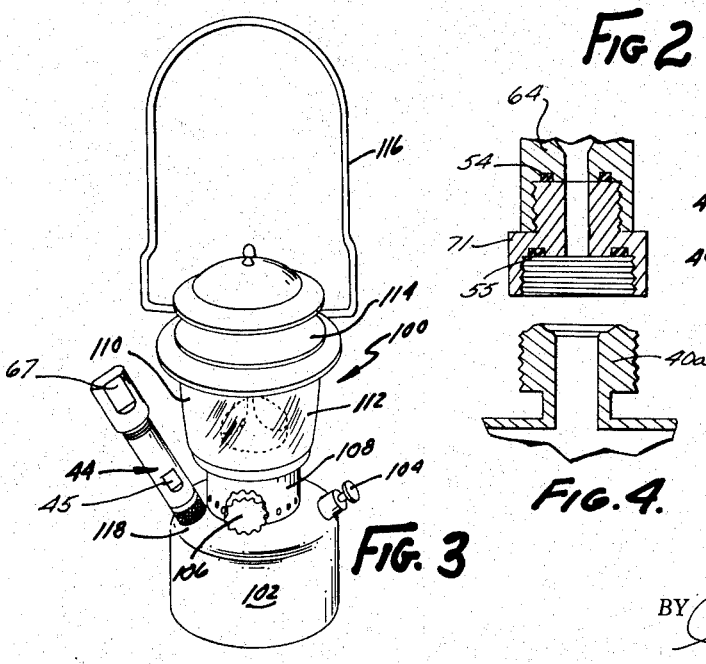
FIG. 3 is a perspective view of a lantern employing the novel filler cap assembly in combination.

The novel attachment may also be employed on the gasoline tank of lanterns or heaters. A lantern assembly 100 is illustrated in FIG. 3 as typical. This includes a gasoline tank 102 normally having a manual pump 104 thereon, and a fuel control valve 106 for transfer of the pressurized gasoline from tank 102 to the vaporizer 108 for burner 110 with its usual mantels. The lantern includes a glass enclosure 112 around the burner, with a vent hood 114 and carrying handle 116. On the filler spout 118 of the tank is mounted the novel assembly 44 in exactly the same manner as that illustrated in FIG. 2. The operation thereof is also the same as that described with respect to the cooking stove in FIG. 1. It could also be employed in like manner on the gasoline tank of heaters, torches, and the like.

It is realized that various types of pressure units have been employed on stoves before, and indeed, the concept of employing pressurized gas is not new. However, the invention is a particular type of dual functioning gasoline tank filler spout cap and pressurizer unit attachable either to new or used stoves, lanterns, or heaters. It enables the gasoline fueled units to be operated with convenience without the tedious manual pumping normally necessary, but without necessary removal of the manual pumping device. It is conceivable that certain details of construction of the dual functioning unit could be changed within the concept presented. Hence, the invention is intended to be limited only by the scope of the appended claims and the reasonably equivalent structures to those defined therein.

I claim:

1. A fuel tank and cap apparatus for the burner of a portable camping unit comprising: a fuel tank vessel for liquid fuel, including a male, externally threaded fuel filler spout, a valved fuel outlet conduit, and a reciprocable, manual plunger pressurizing pump for creating a positive pressure inside said vessel; a combination closure pressurizer assembly threadably attached to said filler spout; said assembly having an elongated housing with a female threaded socket on one end removably engaged over said male filler spout, a sealing gasket in said one end sealing against said filler spout, a pressure-cylinder-receiving and retention chamber in said housing having an open end on the second end of said housing; a removable threaded closure element threadably engaged on the second end of said housing over said open end; sealing means between said closure element and said housing; said closure element including puncture means oriented into said chamber to puncture a pressure cylinder in said chamber after sealing of said closure element to said housing; and passage means from said closure element, through said chamber to said female socket and said filler spout to pressurize said fuel vessel with puncturing of a cylinder in said housing.

2. A fuel tank cap assembly for the liquid fuel tank of portable camping burner units, comprising: an elongated housing with a female threaded socket on one end for threadably engaging a male fuel tank filler spout, and a sealing gasket in said socket for sealing against the spout; a pressure-cylinder-receiving and retention chamber in said housing having an open end on the second end of said housing for replacement of pressure cylinders; said second end being threaded; a removable threaded closure element threadably engaged with said second end of said housing, over said open chamber end; sealing means between said closure element and said housing; said closure element including puncture means oriented toward said chamber to puncture a pressure cylinder in said chamber after said sealing means has sealed; and gas passage means from said chamber to said female socket to pressurize a fuel vessel on which said cap assembly is attached.

3. A fuel tank cap assembly for the liquid fuel tank of portable camping burner units, comprising: an elongated housing with a female threaded socket on one end for threadably engaging a male fuel tank filler spout, and a sealing gasket in said socket for sealing against the spout; a pressure-cylinder-receiving and retention chamber in said housing having an open end on the second end of said housing for replacement of pressure cylinders; said second end being threaded; a removable threaded closure element threadably engaged with said second end of said housing, over said open chamber end; sealing means between said closure element and said housing; puncture means oriented toward said chamber to puncture a pressure cylinder in said chamber after said sealing means has sealed; and gas passage means from said chamber to said female socket to pressurize a fuel vessel on which said cap assembly is attached.

References Cited

UNITED STATES PATENTS

| | | | |
|---|---|---|---|
| 1,854,451 | 4/1932 | Cooney | 222—542 |
| 2,115,052 | 4/1938 | Ward | 141—19 |
| 2,190,688 | 2/1940 | Snelling | 141—19 |
| 2,285,689 | 6/1942 | Tullis | 158—32 |
| 2,349,480 | 5/1944 | Walk | 222—5 |
| 2,659,629 | 11/1953 | Graham | 141—19 |
| 2,812,783 | 11/1957 | Bufogle | 222—390 |
| 3,111,133 | 11/1963 | Fulton et al. | 222—5 |

WALTER SOBIN, *Primary Examiner.*